United States Patent
Zhang et al.

(10) Patent No.: US 10,306,579 B2
(45) Date of Patent: May 28, 2019

(54) USER PLANE FOR FIFTH GENERATION CELLULAR ARCHITECTURE

(71) Applicant: Apple Inc., Cupertino, CA (US)

(72) Inventors: Dawei Zhang, Saratoga, CA (US); Haijing Hu, Beijing (CN); Huarui Liang, Beijing (CN)

(73) Assignee: Apple Inc., Cupertino, CA (US)

( * ) Notice: Subject to any disclaimer, the term of this patent is extended or adjusted under 35 U.S.C. 154(b) by 197 days.

(21) Appl. No.: 15/030,159

(22) PCT Filed: Sep. 30, 2015

(86) PCT No.: PCT/CN2015/091174
§ 371 (c)(1),
(2) Date: Apr. 18, 2016

(87) PCT Pub. No.: WO2017/054155
PCT Pub. Date: Apr. 6, 2017

(65) Prior Publication Data
US 2017/0265057 A1    Sep. 14, 2017

(51) Int. Cl.
*H04W 8/04* (2009.01)
*H04L 29/12* (2006.01)
(Continued)

(52) U.S. Cl.
CPC ....... *H04W 60/005* (2013.01); *H04L 61/1511* (2013.01); *H04L 61/1588* (2013.01);
(Continued)

(58) Field of Classification Search
CPC .. H04L 61/1511; H04L 61/1588; H04W 8/04; H04W 60/005
See application file for complete search history.

(56) References Cited

U.S. PATENT DOCUMENTS 8,547,912 B1   10/2013  Breau
2001/0031635 A1*  10/2001  Bharatia ............... H04W 12/08
                                                          455/432.1
(Continued)

FOREIGN PATENT DOCUMENTS

CN    101006736    7/2007
CN    103428220    4/2013
(Continued)

OTHER PUBLICATIONS

International Search Report and Written Opinion for PCT/CN2015/091174, Jun. 22, 2016, pp. 1-11.
(Continued)

*Primary Examiner* — Omer S Mian
(74) *Attorney, Agent, or Firm* — Meyertons Hood Kivlin Kowert & Goetzel, P.C.; Jeffrey C. Hood; Brian E. Moore

(57) ABSTRACT

Apparatuses, systems, and methods to perform attachment of a wireless device to a next generation gateway via either a base station of a next generation radio access network (RAN) or a mobility management entity of a legacy RAN. An apparatus may be configured to receive an attachment request from a wireless device, determine authentication information via communication with a home subscriber server, determine, based at least in part on the authentication information, whether the wireless device is capable of communicating via the next generation RAT, and send, in response to determining the wireless device is capable, a connection request to a gateway of the next generation RAN. The authentication information may include subscription information associated with the wireless device.

20 Claims, 12 Drawing Sheets

(51) Int. Cl.
*H04W 60/00* (2009.01)
*H04W 48/04* (2009.01)
*H04W 12/06* (2009.01)
*H04W 60/04* (2009.01)
*H04W 88/16* (2009.01)
*H04W 88/00* (2009.01)

(52) U.S. Cl.
CPC ............. *H04W 8/04* (2013.01); *H04W 12/06* (2013.01); *H04W 48/04* (2013.01); *H04W 60/00* (2013.01); *H04W 60/04* (2013.01); *H04W 88/005* (2013.01); *H04W 88/16* (2013.01)

(56) References Cited

U.S. PATENT DOCUMENTS

| | | |
|---|---|---|
| 2007/0208855 A1 | 9/2007 | Yegani et al. |
| 2009/0016300 A1* | 1/2009 | Ahmavaara ........ H04W 36/0072 370/331 |
| 2010/0020767 A1 | 1/2010 | Kumai et al. |
| 2010/0128649 A1* | 5/2010 | Gonsa ................ H04W 72/005 370/312 |
| 2010/0226350 A1* | 9/2010 | Lim .................... H04W 8/26 370/338 |
| 2011/0009120 A1* | 1/2011 | You .................... H04W 36/0022 455/436 |
| 2011/0268084 A1* | 11/2011 | Tanabe ............... H04W 36/0022 370/331 |
| 2012/0084449 A1 | 4/2012 | Delos Reyes |
| 2012/0094667 A1* | 4/2012 | Nishida ................ H04W 60/00 455/435.1 |
| 2012/0157100 A1* | 6/2012 | Suzuki ................ H04W 48/18 455/435.2 |
| 2014/0004830 A1* | 1/2014 | McCann .............. H04W 12/06 455/411 |
| 2014/0153559 A1* | 6/2014 | Roeland .............. H04L 61/304 370/338 |
| 2015/0003415 A1 | 1/2015 | Muley et al. |
| 2015/0023247 A1* | 1/2015 | Hsu ..................... H04W 12/06 370/328 |
| 2016/0006624 A1* | 1/2016 | Martini ............... H04L 61/1511 709/224 |
| 2016/0007138 A1* | 1/2016 | Palanisamy .......... H04W 4/005 455/41.2 |
| 2016/0100362 A1* | 4/2016 | Palanisamy ....... H04W 52/0212 370/311 |
| 2016/0112916 A1* | 4/2016 | Kim .................... H04W 8/02 455/436 |
| 2016/0277956 A1* | 9/2016 | Lindheimer ......... H04W 36/22 |
| 2016/0309379 A1* | 10/2016 | Pelletier .............. H04W 76/022 |
| 2017/0034767 A1* | 2/2017 | Griot ................... H04W 48/10 |
| 2018/0020418 A1* | 1/2018 | Chandramouli .... H04W 60/005 |

FOREIGN PATENT DOCUMENTS

| | | |
|---|---|---|
| WO | 2015166099 A1 | 11/2015 |
| WO | 2016003248 A1 | 1/2016 |

OTHER PUBLICATIONS

Samsung; "UE capability exchange in 3GPP access"; 3GPP Draft; TD S2-0811113; 3rd Generation Partnership Project (3GPP), Mobile Competence Centre; 650, Route Des Lucioles; F-06921 Sophia-Antipolis Cedex; France, vol. SA WG2, No. Athens; Feb. 8, 2008; XP050263533; two pages.

"3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP Standard; 3GPP TS 23.401, 3rd Generation Partnership Project (3GPP), Mobile Competence Centre; 650, Route Des Lucioles; F-06921 Sophia-Antipolis Cedex; France, vol. SA WG2, No. VI3.4.0; Sep. 15, 2015, XP050996004; pp. 1-334.

Supplementary European Search Report, European Patent application 15905067.3, dated Jan. 25, 2019, nine pages.

* cited by examiner

——— Defined Interface/reference Point    — — Potential Interface/reference Point

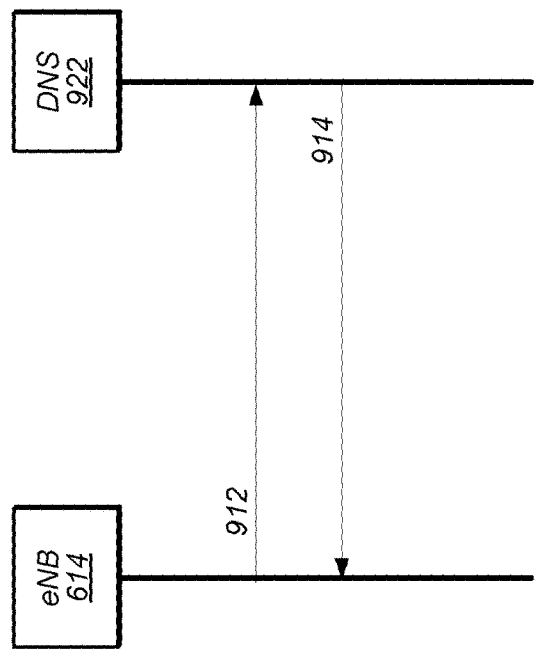
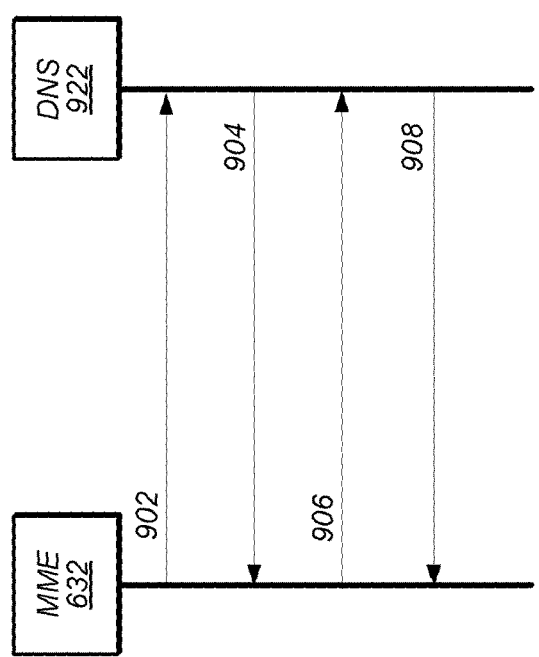
FIG. 9B
FIG. 9A

USER PLANE FOR FIFTH GENERATION CELLULAR ARCHITECTURE

FIELD

The present application relates to wireless devices, and more particularly to apparatus, systems, and methods for attaching a wireless device to a gateway of a next generation radio access technology.

DESCRIPTION OF THE RELATED ART

Wireless communication systems are rapidly growing in usage. Further, wireless communication technology has evolved from voice-only communications to also include the transmission of data, such as Internet and multimedia content. Thus, improvements in the field are desired.

SUMMARY

Embodiments relate to apparatuses, systems, and methods to perform attachment of a wireless device to a next generation gateway via either a base station of a next generation radio access network (RAN) or a mobility management entity of a legacy RAN. The apparatuses, systems, and methods presented herein may allow for internet protocol (IP) address continuity for a wireless device as the wireless devices moves between legacy RANs and the next generation RAN.

According to some embodiments, an apparatus may be configured to receive an attachment request from a wireless device, determine authentication information via communication with a home subscriber server, determine, based at least in part on the authentication information, whether the wireless device is capable of communicating via the next generation RAT, and send, in response to determining the wireless device is capable, a connection request to a gateway of the next generation RAN. The authentication information may include subscription information associated with the wireless device.

In some embodiments, a base station (e.g., a base station in the next generation RAN) may include a radio and a processing element operatively coupled to the radio. The base station may be configured to receive an attachment request from the wireless device and determine authentication information via communication with a home subscriber server (HSS). In addition, the base station may be configured to determine, based at least in part on the authentication information, whether the wireless device is capable of communication via a next generation radio access network (RAN) and send, in response to determining that the wireless device is capable of communication via the next generation RAN, a connection request to a gateway of the next generation RAN.

In some embodiments, a network node may include a processing element configured to receive, from a base station (e.g., a base station in a legacy RAN), an attachment request for a wireless device and send an authentication request to a HSS. The processing element may also be configured to receive authentication information from the HSS and determine, based at least in part on the authentication information, whether the wireless device is capable of communication via a next generation RAN. Additionally, in response to determining that the wireless device is capable of communication via the next generation RAN, the processing element may be configured to send a connection request to a gateway of the next generation RAN.

In some embodiments, a processing element of a network node may execute program instructions stored on a non-transitory computer accessible memory medium which may cause the network node to receive, from a base station (e.g., a base station in a legacy RAN), an attachment request for a wireless device and send an authentication request to a HSS. Further, program instructions, when executed, may cause the network node to receive authentication information from the HSS and determine, based at least in part on the authentication information, whether the wireless device is capable of communication via a next generation RAN. Additionally, when executed, the program instructions may cause the network node to send, in response to determining that the wireless device is capable of communication via the next generation RAN, a message to the wireless device, wherein the message indicates that the attachment request has been denied. The message may include a request for the wireless device to attach via a next generation base station.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIGS. 9A and 9B illustrate signaling diagrams for DNS queries according to some embodiments;

Figure 1:
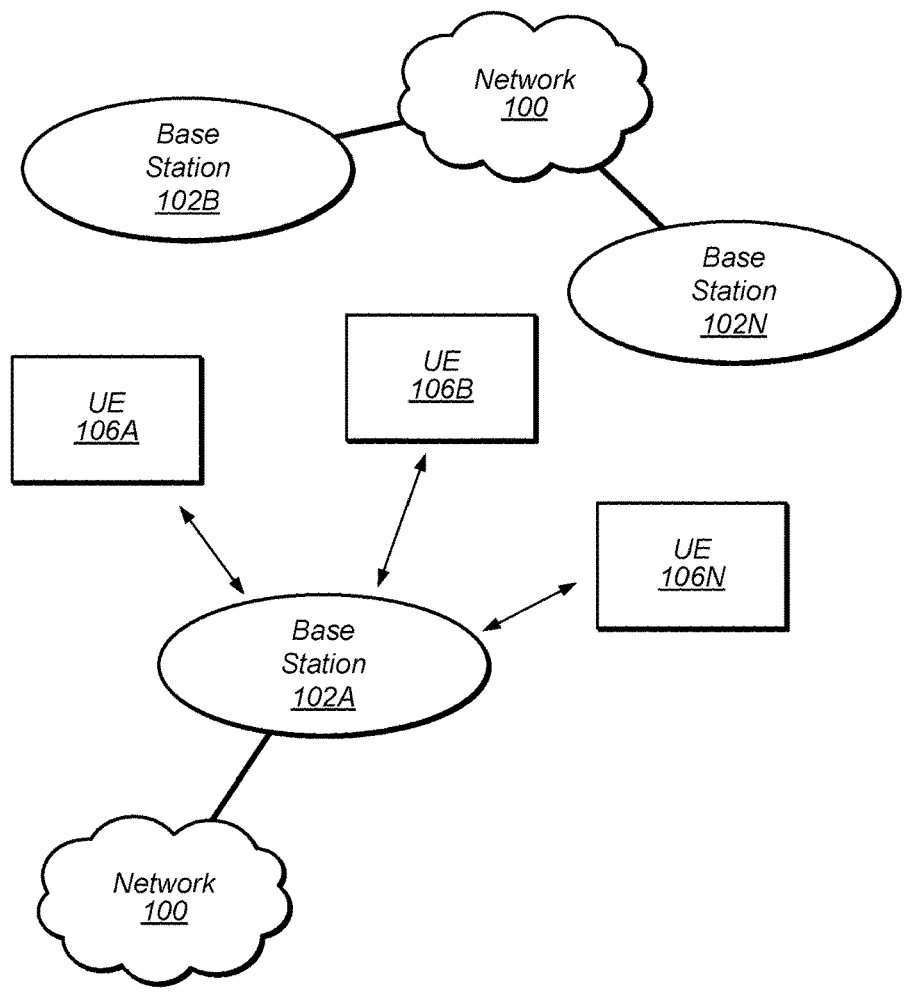
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
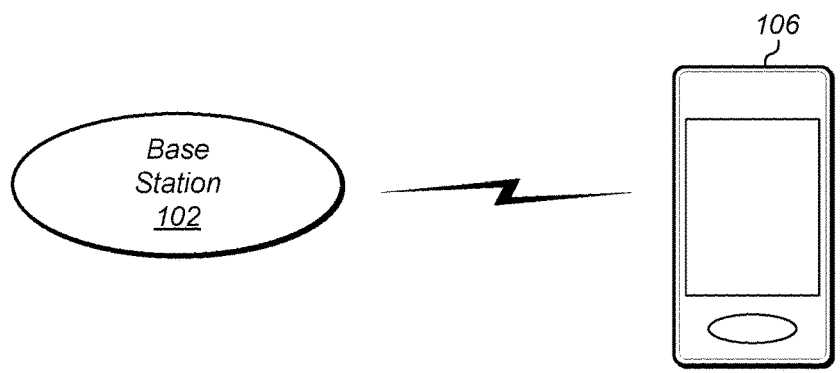
FIG. 2 illustrates a base station (BS) in communication with a user equipment (UE) device according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), HSPA, 3GPP2 CDMA2000 (e.g., 1×RTT, 1× EV-DO, HRPD, eHRPD), etc. Note that if the base station 102A is implemented in the context of LTE, it may alternately be referred to as an 'eNodeB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, HSPA, 3GPP2 CDMA2000 (e.g., 1×RTT, 1× EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
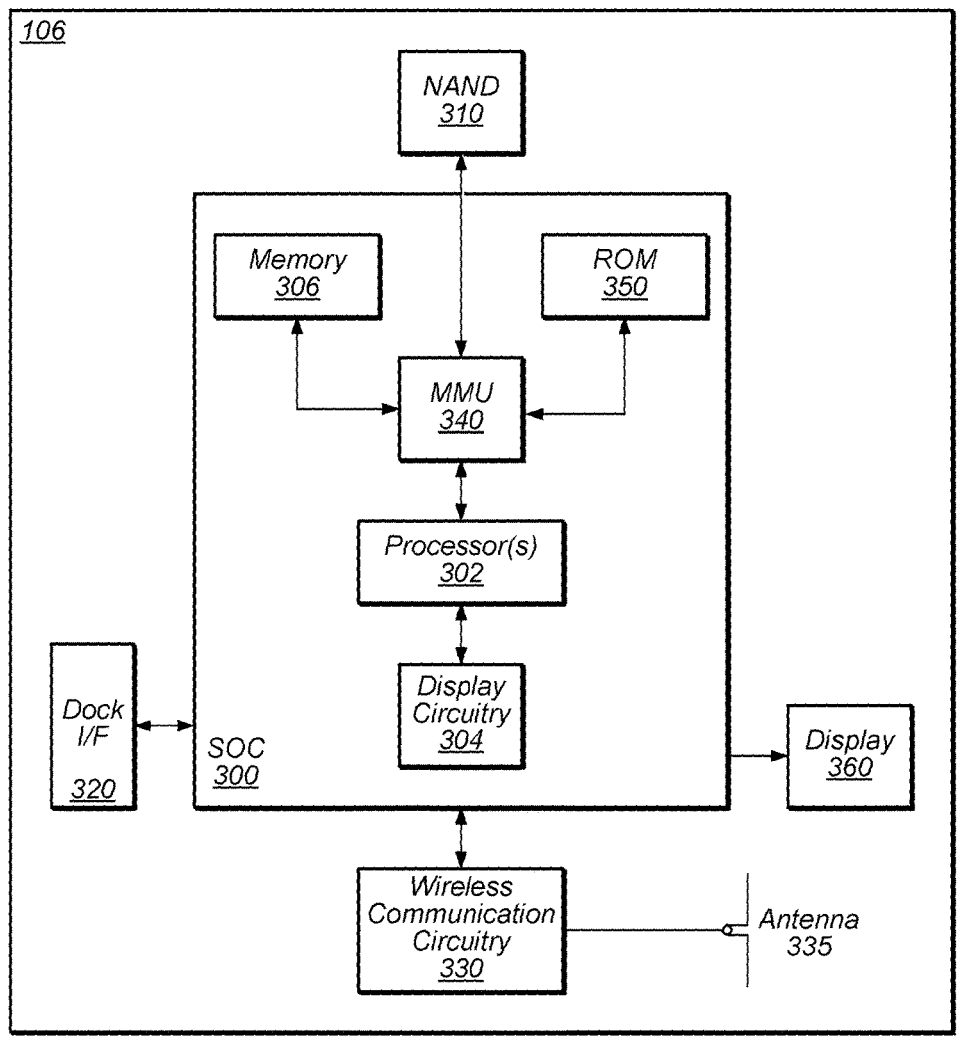
FIG. 3 illustrates an example block diagram of a UE according to some embodiments.

FIG. 3—Block Diagram of a UE

FIG. 3 illustrates an example block diagram of a UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, CDMA2000, Bluetooth, Wi-Fi, GPS, etc.).

As shown, the UE device 106 may include at least one antenna (and possibly multiple antennas, e.g., for MIMO and/or for implementing different wireless communication technologies, among various possibilities) for performing wireless communication with base stations, access points, and/or other devices. For example, the UE device 106 may use antenna 335 to perform the wireless communication.

The UE 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 340, 350, 360 may be configured to implement part or all of the features described herein.

In addition, as described herein, processor 302 may be comprised of one or more processing elements. In other words, one or more processing elements may be included in processor 302. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor 302.

Further, as described herein, radio 330 may be comprised of one or more processing elements. In other words, one or more processing elements may be included in radio 330. Thus, radio 330 may include one or more integrated circuits (ICs) that are configured to perform the functions of radio 330. In addition, each integrated circuit may include circuitry (e.g., first circuitry, second circuitry, etc.) configured to perform the functions of radio 330.

Figure 4:
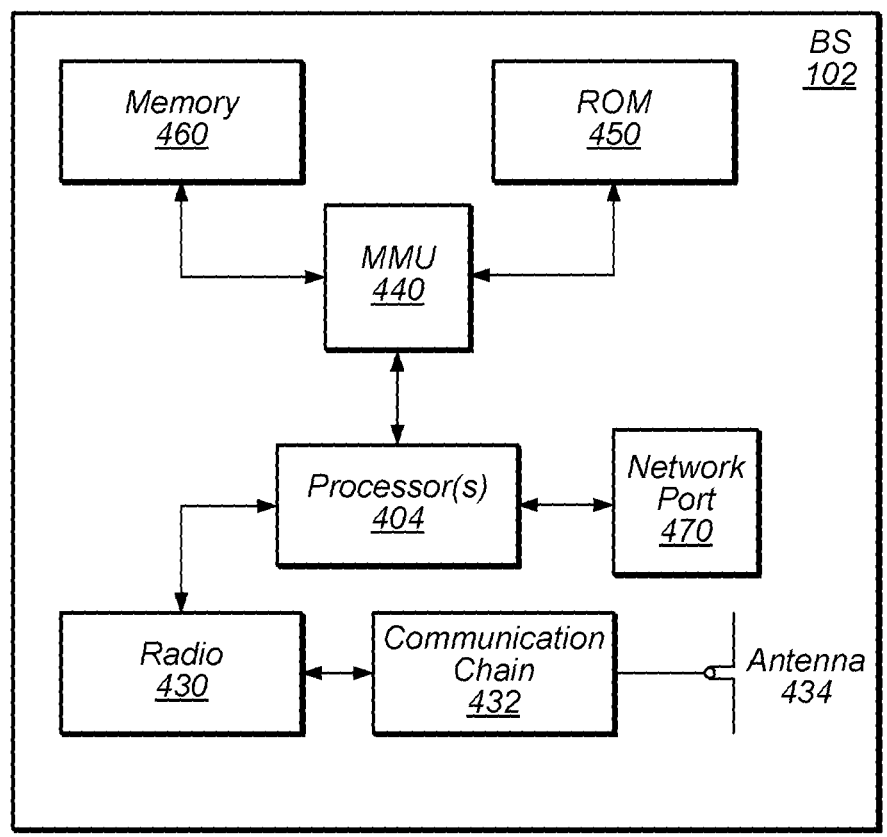
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

User Plane for Next Generation Cellular Network

Figure 5A:
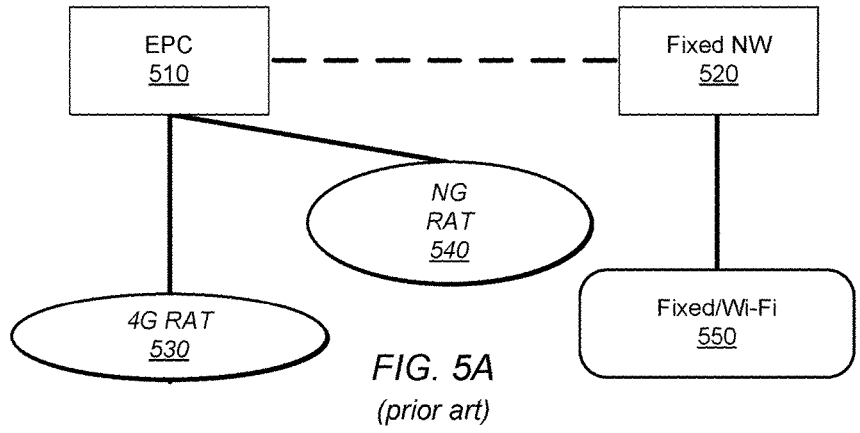
FIGS. 5A-5C illustrate possible implementations of a next generation RAT, according to the prior art.
Figure 5B:
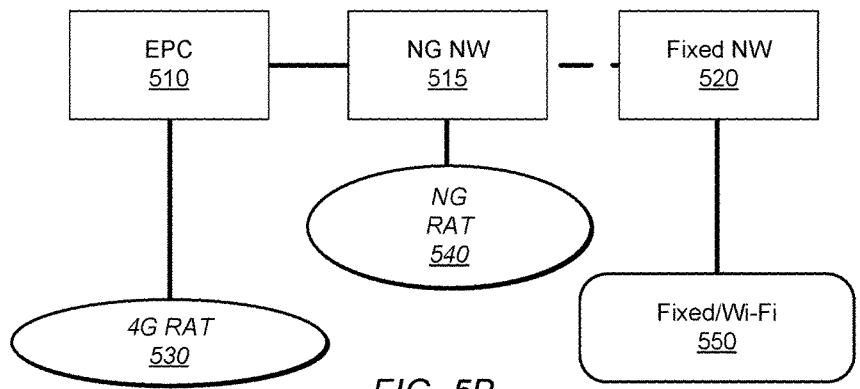
Figure 5C:
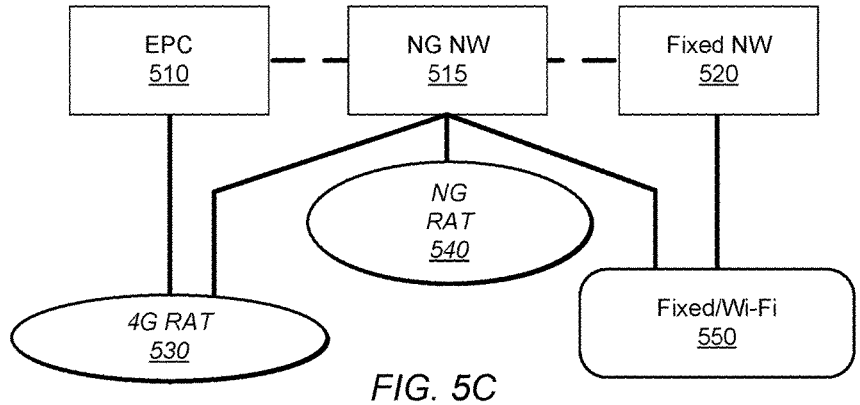

FIGS. 5A-5C illustrate possible implementations of a next generation cellular network, according to the prior art. In general, each implementation is based on architecture design principles for radio, network, and operations and management of the next generation cellular network (i.e., next generation RAN). For example, according to the architecture design principles, radios may leverage the radio frequency (RF) spectrum by exploiting higher frequencies and/or the unlicensed RF spectrum, split user and control planes, split uplink and downlink, and/or allow for multiple connectivity. As another example, radios may enable cost-effective dense deployments via integration of third-party and/or user deployments, automation of configuration, optimization, and healing, enhancement of multi-RAT coordination, and/or support of multi-operator and/or shared use infrastructures. Further, radios may coordinate and cancel interference by supporting expanded MIMO and coordinated multipoint (CoMP) and exploiting controlled non-orthogonal interference. In addition, radios may support dynamic radio topologies such as moving cells, relays, hubs, cloud radio access network (C-RAN) and distributed RAN (D-RAN) and support device to device communications (D2D) (e.g., for latency and/or disaster relief).

Additionally, according to the architecture design principles, next generation networks may create a common composable core by minimizing entities and functionalities within the next generation network, splitting control and user planes, supporting a lean protocol stack, not requiring any mandatory user plane functions, minimizing legacy interworking, having a RAT-agnostic core, and supporting a convergence of fixed (e.g., wired) and mobile (e.g., wireless) systems. Further, according to the architecture design principles, operations and management may be simplified via automation and self-healing, probeless monitoring, collaborative management, integrated OAM functionality, and carrier-grade network cloud orchestration.

In addition to the principles directed to radios, networks, and OAM, next generation architecture design principles also include embracing flexible functions and capabilities such as network slicing, function variance, flexible function/service/application allocation, leveraging of network functions virtuali zati on (NFV) and software defined networking (SDN), state-disintegrated functions, and graceful degradation. Further, new value creation such as exploitation of big data and context awareness, exposing of radio and network APIs, and facilitation of anything as a service (XaaS) should be supported. Additionally, security and privacy should be built in via extending control plane security (e.g., via HetNets) and ensuring location privacy and identity protection from (unlawful) disclosure.

Turning now to FIGS. 5A-5C, illustrated are possible implementations of a next generation wireless communication architecture based on the principles described above, according to the prior art. As shown, FIG. 5A illustrates an implementation in which there are defined interfaces between evolved packet core (EPC) 510 and existing 4G RAT 530 and next generation (NG) RAT 540. Additionally, there is a defined interface between fixed network (NW) 520 and fixed networks/Wi-Fi networks 550. Further, there is a potential interface between EPC 510 and fixed NW 520. Main features of this architectural proposal include: (1) no changes to the fourth generation (4G) RAN; and (2) such an architecture would not require revolutionary next generation network function design. However, such an architecture would depend on the current legacy paradigm for all use cases, which may result in increased expense relative to other approaches.

FIG. 5B illustrates another implementation based on the principles described above. As shown, such an implementation would introduce next generation (NG) NW 515 which would include next generation network functions. Thus, there would be defined interfaces between EPC 510 and 4G RAT 530, NG NW 515 and NG RAT 540, fixed NW 520 and fixed networks/Wi-Fi networks 550, and EPC 510 and NG NW 515. Additionally, there would be a potential interface between NG NW 515 and fixed NW 520. Main features of this architectural proposal include: (1) no changes to the 4G RAN; and (2) such an architecture would include a new RAT design (e.g., NG NW 515) which could be optimized to fully benefit from new technologies such as virtualization. However, such an architecture could only be utilized where there is new RAT coverage, and there may be potential signaling burdens due to mobility if the new RAT does not provide seamless coverage.

FIG. 5C illustrates yet another implementation based on the principles described above. As shown, such an implementation would introduce NG NW 515 which would include next generation network functions. Thus, there would be defined interfaces between EPC 510 and 4G RAT 530, NG NW 515 and next generation RAT 540, fixed NW 520 and fixed networks/Wi-Fi networks 550. Additionally, there would be defined interfaces between NG NW 515 and 4G RAT 530 and NG NW 515 and fixed networks/Wi-Fi networks 550. Further, there would be a potential interface between NG NW 515 and EPC 510 as well as NG NW 515 and fixed NW 520. Main features of this architectural proposal include a new RAT design (e.g., NG NW 515) which could be optimized to fully benefit from new technologies such as virtualization, a sound migration path from older RAT technologies, and seamless coverage during mobility. However, such an architecture may stress legacy RANs, such as due to concurrent operation of legacy functions and new next generation functions.

Other issues with the above implementations include service continuity between various RATs as the next generation architecture will likely support more RATs than current architectures. Additionally, the coexistence of current networks with the next generation network may create mobility issues for both legacy and next generation users. Further, next generation architectures will support control and user plane splitting, a minimization of network nodes and a simplification of network functions which may also impact continuity between different RATs. Therefore, improvements in continuity between legacy RATs (e.g., 4G and 3G RATs) and next generation RATs are desirable.

Next Generation Network Interface Architecture for IP Connection Continuity

Figure 6A:
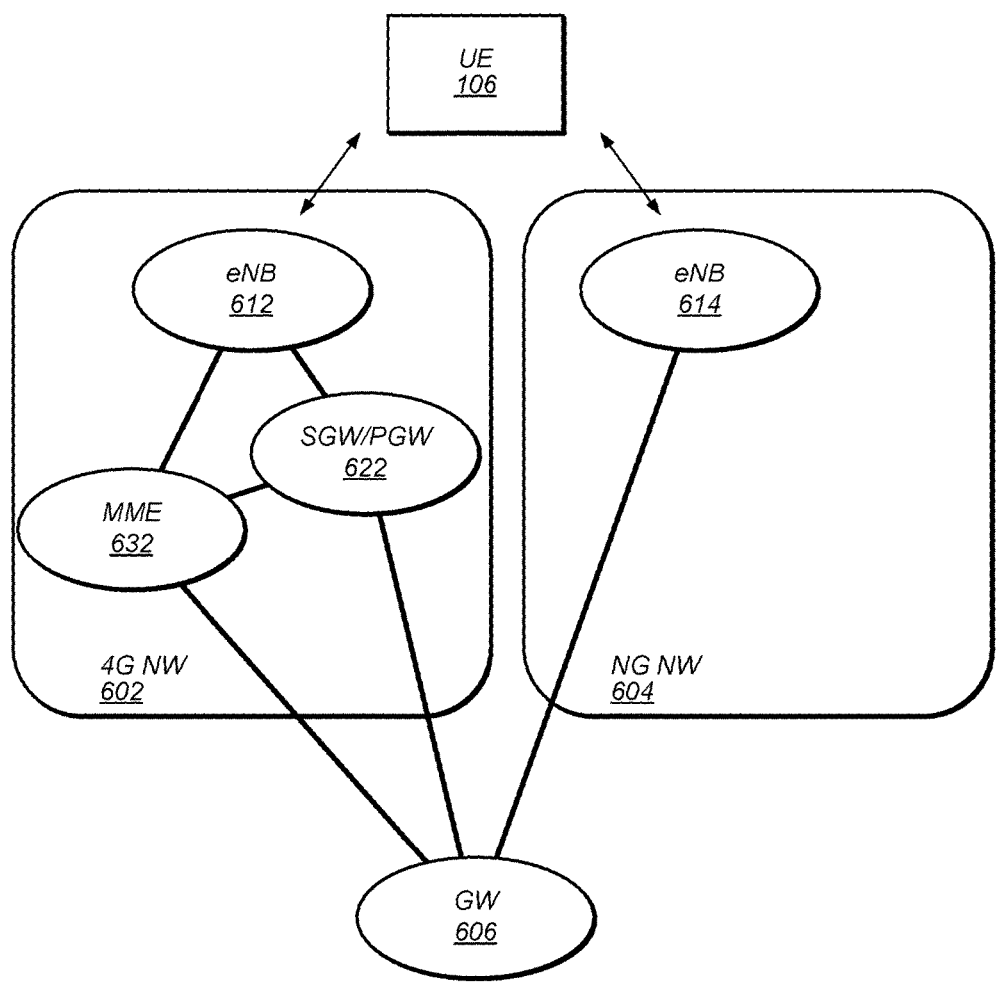
FIG. 6A illustrates a next generation network interface architecture according to some embodiments.
Figure 6B:
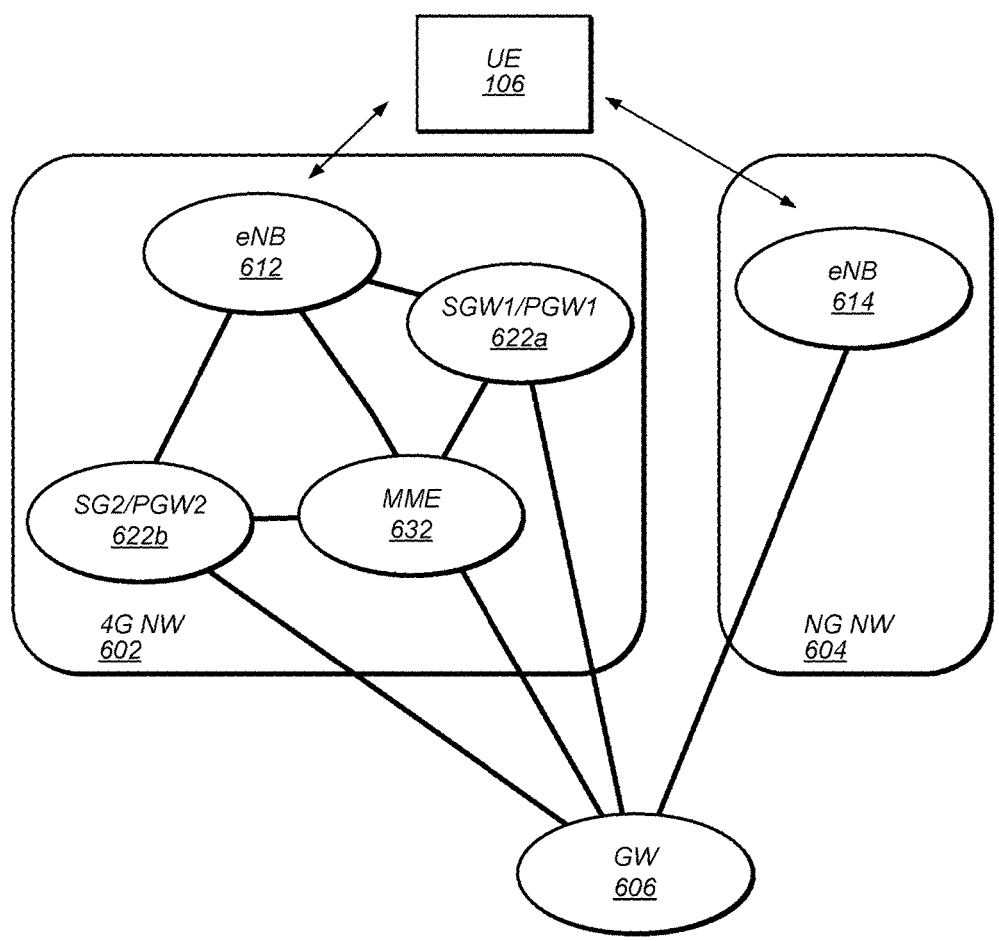
FIG. 6B illustrates a next generation network interface architecture according to some embodiments.

FIGS. 6A and 6B illustrate next generation network interface architectures according to some embodiments. FIG. 6A illustrates a next generation gateway, such as GW 606, that may interface with entities within a legacy network, such as 4G NW 602 and entities within a next generation network, such as NG NW 604. Thus, a first interface may be defined between GW 606 and mobility management entity (MME) 632, which may be included in 4G NW 602. In addition, a second interface may be defined between GW 606 and server gateway and packet gateway (SGW/PGW) 622, which may also be included in 4G NW 602. Further, a third interface may be defined between GW 606 and next generation base station (eNB) 614, which may be included in NG NW 604. Note that within 4G NW 602, a legacy base station such as eNB 612 may interface with both MME 632 and SGW/PGW 622. Further, there may be an interface between MME 632 and SGW/PGW 622. In addition, UE 106 may communicate wirelessly with both eNB 612 and eNB 614.

FIG. 6B illustrates another next generation architecture according to embodiments. As shown, GW 606 may interface with entities within legacy network 4G NW 602 and entities within next generation network NG NW 604. Thus, a first interface may be defined between GW 606 and mobility management entity (MME) 632, which may be included in 4G NW 602. In addition, a second interface may be defined between GW 606 and SGW1/PGW1 622A and SGW2/PGW2 622B, which may both be included in 4G NW 602. Further, a third interface may be defined between GW 606 and eNB 614, which may be included in NG NW 604. Note that within 4G NW 602, a legacy base station such as eNB 612 may interface with both MME 632 and SGW1/PGW1 622A and SGW2/PGW2 622B. Further, there may be interfaces between MME 632 and SGW1/PGW1 622A and SGW2/PGW2 622B. In addition, UE 106 may communicate wirelessly with both eNB 612 and eNB 614.

MME 632 may be or include any switch, server, or other node within 4G NW 602. Thus, MME 632 may include a portion of, or all of, the elements described above in reference to base station 102. Hence, MME 632 may include one or more processing elements (or processors) which may execute program instructions and the processing elements may be coupled to a memory management unit, which may be configured to receive addresses from the processing elements and translate those addresses to locations in a memory or to other circuits or devices. In addition, MME 632 may include at least one network port and one or more antennas coupled to at least one radio. MME 632 may be configured to operate as a wireless transceiver and may be further configured to communicate with UE devices, such as UE 106 using various wireless communication standards.

In addition, eNB 612 may be a legacy base station and may be configured as described above with reference to FIG. 4 and base station 102. Thus, eNB 612 may be configured to communicate using various legacy wireless communication standards such as LTE, LTE-A, GSM, UMTS, CDMA2000, Wi-Fi, etc.

Further, eNB 614 may be a next generation base station and may include components similar to the components described above with reference to base station 102. Thus, eNB 614 may include one or more processing elements (or processors) which may execute program instructions. The processing elements may be coupled to a memory management unit, which may be configured to receive addresses from the processing elements and translate those addresses to locations in a memory or to other circuits or devices. In addition, eNB 614 may include at least one network port and one or more antennas coupled to at least one radio. Further, eNB 614 may be configured to operate as a wireless transceiver and may be further configured to communicate with UE devices, such as UE 106 using a next generation wireless communication standards, such as a NG RAT.

In some embodiments, if UE 106 first attaches from NG NW 604 and also selects GW 606 as further described below, SGW1/PGW1 622A may also be assigned to UE 106. Thus, when UE 106 moves back to 4G NW 602, MME 632 may select SGW1/PGW1 since it has already been assigned. In addition, in some embodiments, if UE 106 first attaches from 4G NW 602, MME 632 may select a default SGW/PGW such as SGW2/PGW2 622B based on a DNS query. As further described below, SGW2/PGW2 622B may be mapped to GW 606. Thus, when UE 106 moves to NG NW 604, GW 606 may be selected by eNB 614 based on the mapping. In addition, when UE 106 returns to 4G NW 602, MME 632 will again select SGW2/PGW2 622B instead of performing the DNS query. Thus, whether UE 106 first attaches from 4G NW 602 or NG NW 604, IP connection continuity (e.g., original IP address and first SGW/PGW and GW) will be maintained as UE 106 moves between networks.

Figure 7A:
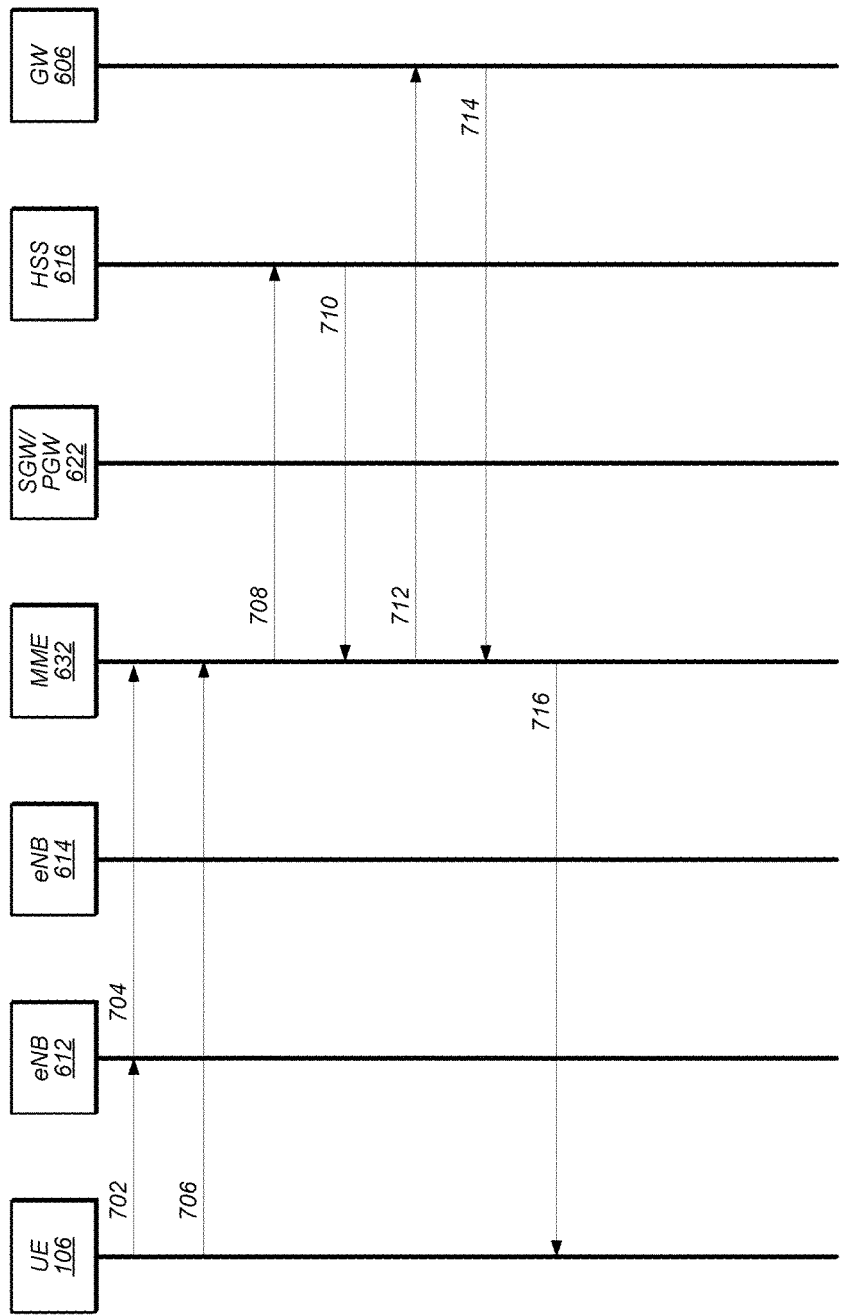
FIGS. 7A and 7B illustrate signaling diagrams for IP address continuity according to some embodiments.
Figure 7B:
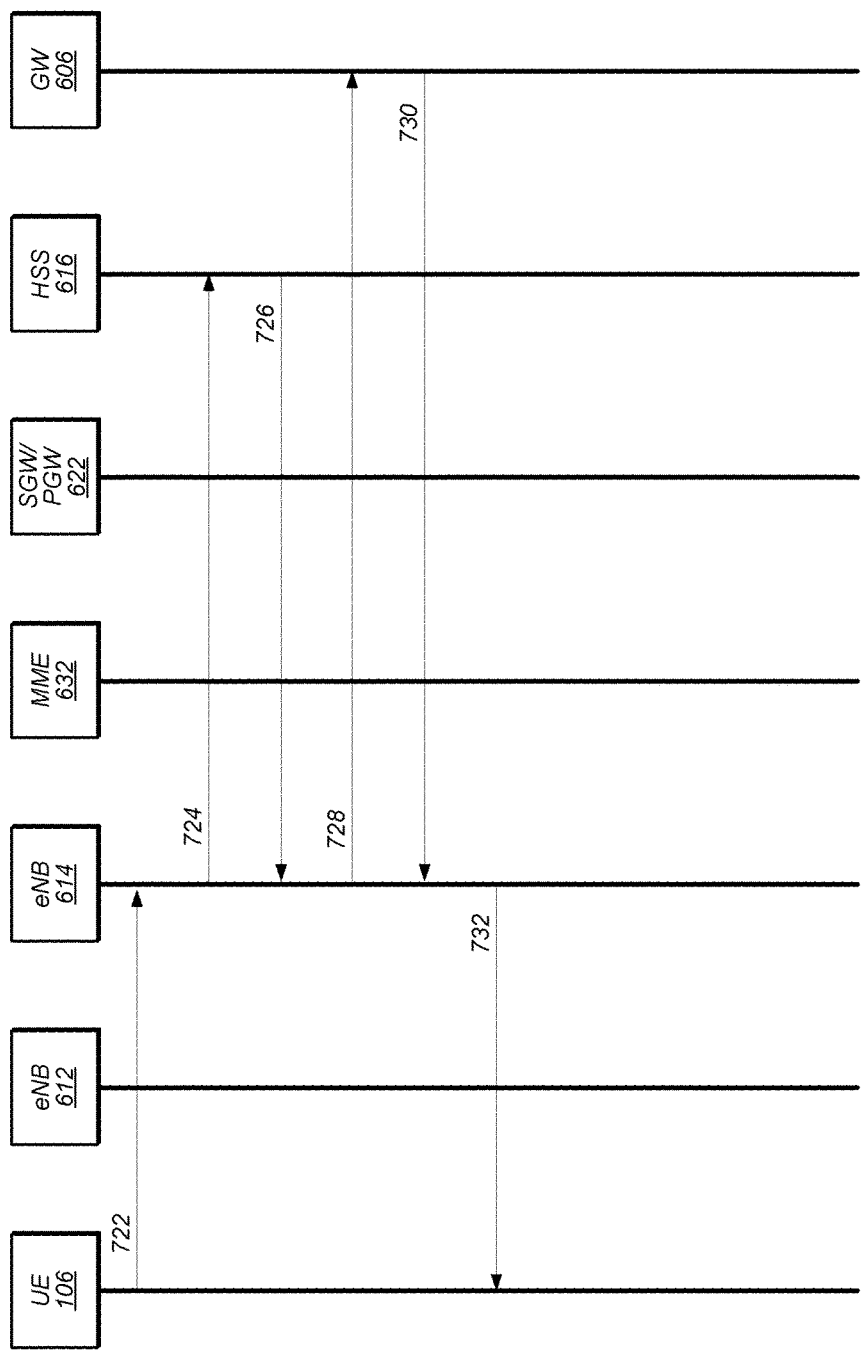
Figure 8:
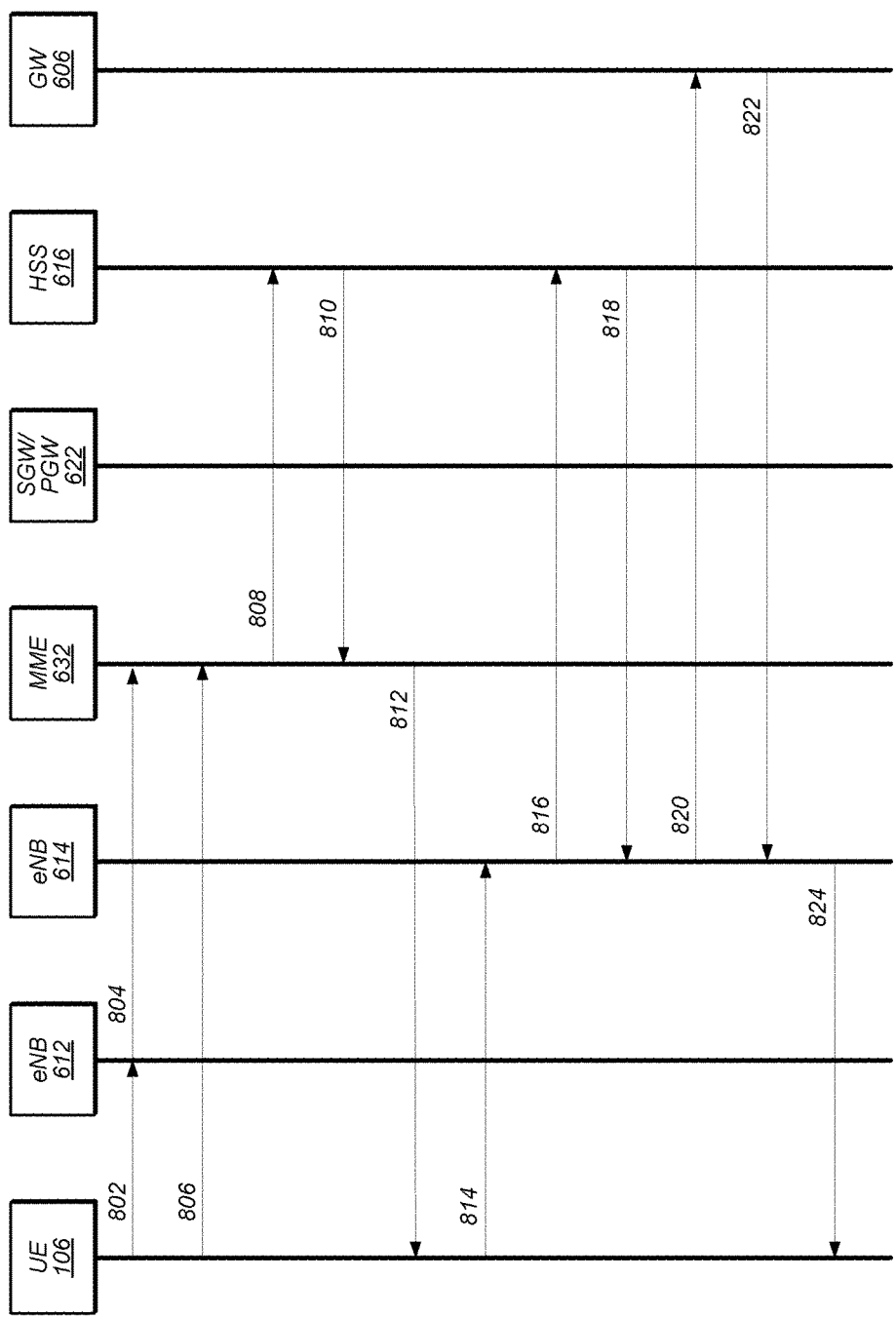
FIG. 8 illustrates a signaling diagram for IP address continuity according to some embodiments.

Turning now to FIGS. 7A-7B and 8, communications between the various entities illustrated in FIG. 6 will be described. The communications may allow IP connection continuity while switching between 4G NW 602 and NG NW 604.

FIG. 7A illustrates a signaling diagram for maintaining IP continuity between legacy and next generation RATs, according to some embodiments. The signaling shown in FIG. 7A may be used in conjunction with any of the systems or devices shown in the above Figures, among other devices. In various embodiments, some of the signals shown may be performed concurrently, in a different order than shown, or may be omitted. Additional signaling may also be performed as desired.

At 702, UE 106 may send a message to a legacy base station, such as eNB 612. The message may include a request to attach to eNB 612. In some embodiments, the message may be a radio resource control (RRC) connection request. In some embodiments, the message may include an attach request and a packet data network (PDN) connectivity request.

At 704, eNB 612 may send a message to MME 632. The message may include the request from UE 106 to attach to eNB 612. In some embodiments, the message may include the attach request and/or the PDN connectivity request. In some embodiments, the message may be an S1 message.

At 706, UE 106 may send an additional message to MME 632. In some embodiments, the message may be an attach message (e.g., a non-access stratum (NAS) message).

At 708, MME 632 may send a message to home subscriber server (HSS) 616 to authenticate UE 106. In some embodiments, the message may include various parameters such as visited public land mobile network identification (PLMN ID) as well as subscription information. In some embodiments, the message may be or include an authentication information request.

At 710, HSS 616 may send a message to MME 632. In some embodiments, the message may include authentication information for authenticating UE 106. In addition, the message may include subscription information. MME 632 may determine, based at least in part on the message received from HSS 616 whether UE 106 supports a next generation RAT. For example, MME 632 may determine whether UE 106 subscribes to (or whether UE 106 is associated with a subscription for) the next generation RAT.

At 712, MME 632, in response to determining that UE 106 supports (and/or subscribes to) a next generation RAT, may send a message to gateway 606 via the first interface (between the gateway 606 and the MME 632) described above in reference to FIG. 6. In some embodiments, the message may include a request to create a session.

In other words, the message may be a create session request message. In such embodiments, MME 632 may select GW 606 based at least in part on a domain name system (DNS) server retrieval. In addition, a default SGW/PGW may be arranged to correspond to GW 606.

At 714, GW 606 may send a message to MME 632 via the first interface (between the gateway 606 and the MME 632) described above in reference to FIG. 6. In some embodiments, the message may include session information such as an IP address. IN some embodiments, the message by be a create session response.

At 716, MME 632 may send a message to UE 106 indicating that attachment to GW 606 was successful. In some embodiments, the message may include the IP address from GW 606. In some embodiments, MME 632 may send the message to eNB 612 and eNB 612 may forward the message to UE 106.

FIG. 7B illustrates a signaling diagram for maintaining IP continuity between legacy and next generation RATs, according to some embodiments. The signaling shown in FIG. 7B may be used in conjunction with any of the systems or devices shown in the above Figures, among other devices. In various embodiments, some of the signals shown may be performed concurrently, in a different order than shown, or may be omitted. Additional signaling may also be performed as desired.

At 722, UE 106 may send a message to a next generation base station, such as eNB 614. The message may include a request to attach to eNB 614. In some embodiments, the message may be a radio resource control (RRC) connection request. In some embodiments, the message may include an attach request and a packet data network (PDN) connectivity request.

At 724, eNB 614 may send a message to home subscriber server (HSS) 616 to authenticate UE 106. In some embodiments, the message may include various parameters such as visited public land mobile network identification (PLMN ID) as well as subscription information. In some embodiments, the message may be or include an authentication information request.

At 726, HSS 616 may send a message to eNB 614. In some embodiments, the message may include authentication information for authenticating UE 106. In addition, the message may include subscription information. eNB 614 may determine, based at least in part on the message received from HSS 616 whether UE 106 supports a next generation RAT. For example, eNB 614 may determine whether UE 106 subscribes to (or whether UE 106 is associated with a subscription for) the next generation RAT.

At 728, eNB 614, in response to determining that UE 106 supports (and/or subscribes to) a next generation RAT, may send a message to gateway 606 via the third interface (between the gateway 606 and the eNB 614) described above with reference to FIG. 6. In some embodiments, the message may include a request to create a session. In other words, the message may be a create session request message. In such embodiments, eNB 614 may select GW 606 based at least in part on a domain name system (DNS) server retrieval. In addition, a default SGW/PGW may be arranged to correspond to GW 606.

Note that in some embodiments, if eNB 614 determines that UE 106 does not support the next generation RAT, eNB 614 may reject UE 106's attachment request and request UE 106 re-attach from a legacy RAT as described above with reference to FIG. 7A.

At 730, GW 606 may send a message to eNB 614 via the third interface (between the gateway 606 and the eNB 614) described above with reference to FIG. 6. In some embodiments, the message may include session information such as an IP address. In some embodiments, the message by be a create session response.

At 732, eNB 614 may send a message to UE 106 indicating that attachment to GW 606 was successful. In some embodiments, the message may include the IP address from GW 606.

FIG. 8 illustrates a signaling diagram for maintaining IP continuity between legacy and next generation RATs, according to some embodiments. The signaling shown in FIG. 8 may be used in conjunction with any of the systems or devices shown in the above Figures, among other devices. In various embodiments, some of the signals shown may be performed concurrently, in a different order than shown, or may be omitted. Additional signaling may also be performed as desired.

At 802, UE 106 may send a message to a legacy base station, such as eNB 612. The message may include a request to attach to eNB 612. In some embodiments, the message may be a radio resource control (RRC) connection request. In some embodiments, the message may include an attach request and a packet data network (PDN) connectivity request.

At 804, eNB 612 may send a message to MME 632. The message may include the request from UE 106 to attach to eNB 612. In some embodiments, the message may include the attach request and/or the PDN connectivity request. In some embodiments, the message may be an S1 message.

At 806, UE 106 may send an additional message to MME 632. In some embodiments, the message may be an attach message (e.g., a non-access stratum (NAS) message).

At 808, MME 632 may send a message to home subscriber server (HSS) 616 to authenticate UE 106. In some embodiments, the message may include various parameters such as visited public land mobile network identification (PLMN ID) as well as subscription information. In some embodiments, the message may be or include an authentication information request.

At 810, HSS 616 may send a message to MME 632. In some embodiments, the message may include authentication information for authenticating UE 106. In addition, the message may include subscription information. MME 632 may determine, based at least in part on the message received from HSS 616 whether UE 106 supports a next generation RAT. For example, MME 632 may determine whether UE 106 subscribes to (or whether UE 106 is associated with a subscription for) the next generation RAT.

At 812, MME 632, in response to determining that UE 106 supports (and/or subscribes to) a next generation RAT, may send a message to UE 106 indicating that attachment has been rejected. In some embodiments, the message may trigger UE 106 to attempt attachment to GW 606 via eNB 614.

At 814, UE 106 may send a message to a next generation base station, such as eNB 614 in response to receiving the message from MME 632 indicating attachment had been rejected. The message may include a request to attach to eNB 614. In some embodiments, the message may be a radio resource control (RRC) connection request. In some embodiments, the message may include an attach request and a packet data network (PDN) connectivity request.

At 816, eNB 614 may send a message to home subscriber server (HSS) 616 to authenticate UE 106. In some embodiments, the message may include various parameters such as visited public land mobile network identification (PLMN ID) as well as subscription information. In some embodiments, the message may be or include an authentication information request.

At 818, HSS 616 may send a message to eNB 614. In some embodiments, the message may include authentication information for authenticating UE 106. In addition, the message may include subscription information. eNB 614 may determine, based at least in part on the message received from HSS 616 whether UE 106 supports a next generation RAT. For example, eNB 614 may determine whether UE 106 subscribes to (or whether UE 106 is associated with a subscription for) the next generation RAT.

At 820, eNB 614, in response to determining that UE 106 supports (and/or subscribes to) a next generation RAT, may send a message to gateway 606 via the third interface (between the gateway 606 and the eNB 614) described above with reference to FIG. 6. In some embodiments, the message may include a request to create a session. In other words, the message may be a create session request message. In such embodiments, eNB 614 may select GW 606 based at least in part on a domain name system (DNS) server retrieval. In addition, a default SGW/PGW may be arranged to correspond to GW 606.

At 822, GW 606 may send a message to eNB 614 via the third interface (between the gateway 606 and the eNB 614) described above with reference to FIG. 6. In some embodiments, the message may include session information such as an IP address. In some embodiments, the message by be a create session response.

At 824, eNB 614 may send a message to UE 106 indicating that attachment to GW 606 was successful. In some embodiments, the message may include the IP address from GW 606.

FIGS. 9A and 9B illustrate signaling diagrams for a DNS query according to some embodiments. In particular, FIG. 9A illustrates a signaling diagram between a mobility management entity (e.g., MME 632) of a legacy RAT and a domain name system (DNS) server, and FIG. 9B illustrates a signaling diagram between a base station (e.g., eNB 614) in a next generation RAT and the DNS server. Note that the signaling shown in FIGS. 9A and 9B may be used in conjunction with any of the systems or devices shown in the above Figures, among other devices. In various embodiments, some of the signals shown may occur concurrently, in a different order than shown, or may be omitted. Additional signaling may also be performed as desired.

Turning to FIG. 9A, at 902, MME 632 may send a first query to DNS 922. The first query may include a request for a PGW for a legacy mobile network. In other words, the first query may include a request for an access point name (APN) for the legacy mobile network (e.g., 3G or 4G).

At 904, DNS 922 may send a first response to MME 632. The first response may include a PGW address list. The address list may include available PGWs for the legacy mobile network.

At 906, MME 632 may send a second query to DNS 922. The second query may include a request for a PGW for a next generation mobile network. In other words, the second query may include a request for an APN for the next generation mobile network.

Note that in some embodiments, MME 632 may only send one query to DNS 922 and may receive an access point name for the PGW for the next generation mobile network. In addition, in some embodiments, if MME 632 receives the access point name for the PGW for the next generation mobile network, MME 632 may send a query to DNS 922 and may receive a list of SGW/PGW and PGW addresses for the next generation mobile network and, based on the list, MME 632 may select an SGW/PGW and GW for UE 106.

In some embodiments, DNS 922 may have a mapping relationship between PGWs for legacy mobile networks (legacy PGWs) and PGWs for the next generation mobile network (NG PGWs). Such a mapping between legacy PGWs and NG PGWs may allow for (or enable) IP address continuity as a UE moves from legacy RATs and the next generation RAT and back.

In some embodiments, for the mapping relation between legacy PGWs (and/or SGWs) and GW for next generation SGW/PGW (legacy) and NG PGWs may be associated with a particular UE, such as UE 106. In such embodiments, DNS 922 may record a mapping table of SGW/PGW addresses and GWs addresses. In some embodiments, the mapping table may have a plurality of legacy SGW/PGWs and a plurality of NG GWs associated with the particular UE. In some embodiments, DNS 922 may ensure that for the particular UE in a certain period, the same legacy SGW/PGW and NG GW will be assigned to the particular UE. In other words, for a given period of time and/or location of the particular UE, the same legacy SGW/PGW and NG GW will be selected to ensure IP address continuity as the UE moves between legacy and next generation networks.

At 908, DNS 922 may send a second response to MME 632. The second response may include a NG PGW address list. In some embodiments, the second response may also include the mapping between legacy PGWs and NG PGWs.

Turning to FIG. 9B, at 910, eNB 614 may send a first query to DNS 922. The first query may include a request for a PGW for a next generation mobile network. In other words, the second query may include a request for an APN for the next generation mobile network.

In some embodiments, DNS 922 may have a mapping relationship between PGWs for legacy mobile networks (legacy PGWs) and PGWs for the next generation mobile network (NG PGWs). Such a mapping between legacy PGWs and NG PGWs may allow for (or enable) IP address continuity as a UE moves from legacy RATs and the next generation RAT and back.

At 912, DNS 922 may send a first response to eNB 614. The first response may include a NG PGW address list. In some embodiments, the second response may also include the mapping between legacy PGWs and NG PGWs.

Next Generation Protocol Stack

Figure 10:
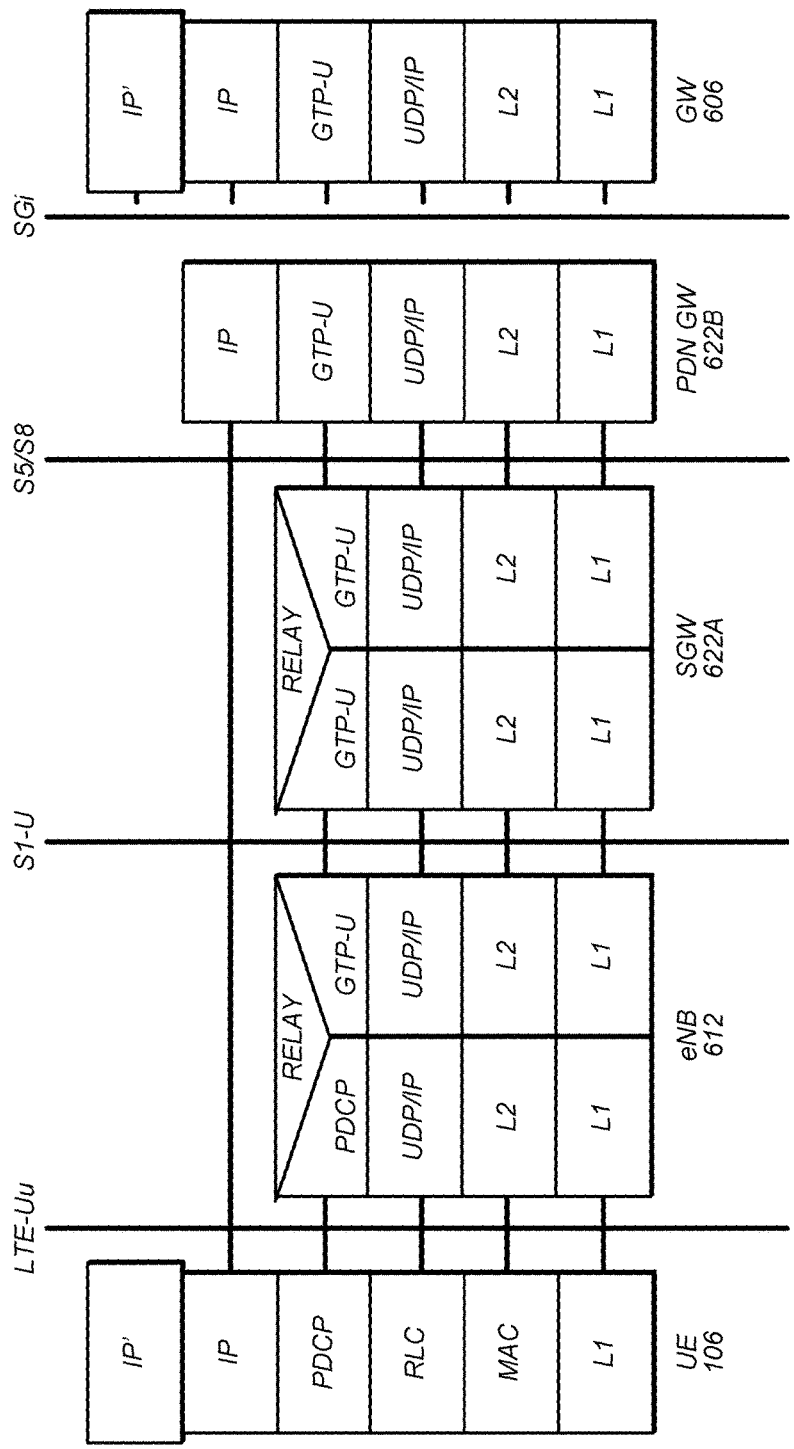
FIG. 10 illustrates a protocol stack for a next generation wireless communication system according to some embodiments.

FIG. 10 illustrates a protocol stack for a next generation wireless communication system according to some embodiments. Note that the protocol stack illustrated is only one of many possible protocol stacks that may be implemented in a next generation wireless communication system. Note further, additional features, elements, and/or layers may be added to protocol stack shown.

As shown, the protocol stack may include existing interfaces such as LTE-Uu between UE 106 and eNB 612, an S1-U (e.g., reference point between E-UTRAN and SGW for per bearer user plane tunneling and inter eNB path switching during handover) interface between eNB 612 and SGW 622A, an S5/S8 (e.g., S5 may be for providing user plane tunneling and tunnel management between SGW and PGW, may be used for SGW relocation due to UE mobility and for SGW connecting to a non-collocated PGW for PDN connectivity and S8 may be an inter-PLMN variant of S5 interface) interface between SGW 622A and PDN GW 622B, and an SGi (e.g., reference point between PGW and the PDN) interface. At UE 106, the protocol stack may include layers L1, MAC, RLC, PDCP, and IP as well as new layer IP' for addressing within the next generation RAN. Thus, UE 106 may maintain IP addresses associated with legacy RANs and the next generation RAN. Further, this may allow for IP address continuity as UE 106 moves between RANs. Protocol stacks for eNB 612 may include layers L1, L2, UDP/IP, and PDCP to communicate with UE 106 and layers L1, L2, UDP/IP, and GTP-U to communicate with SGW 622A. Protocol stacks for SGW 622A may include layers L1, L2, UDP/IP, and GTP-U to communicate with eNB 612 and layers L1, L2, UDP/IP, and GTP-U to communicate with PDN GW 622B. A protocol stack for PDN GW 622B may include layers L1, L2, UDP/IP, and GTP-U for communication with SGW 622A and an IP layer for communication with UE 106. In addition, a protocol stack for GW 606 may include layers L1, L2, UDP/IP, and GTP-U, and IP as well as an IP' layer for communication with UE 106. Note that in some embodiments, the protocol stack may not include the IP' layer and GW 606 may communicate with UE 106 via the IP layer.

Attachment Method

Figure 11A:
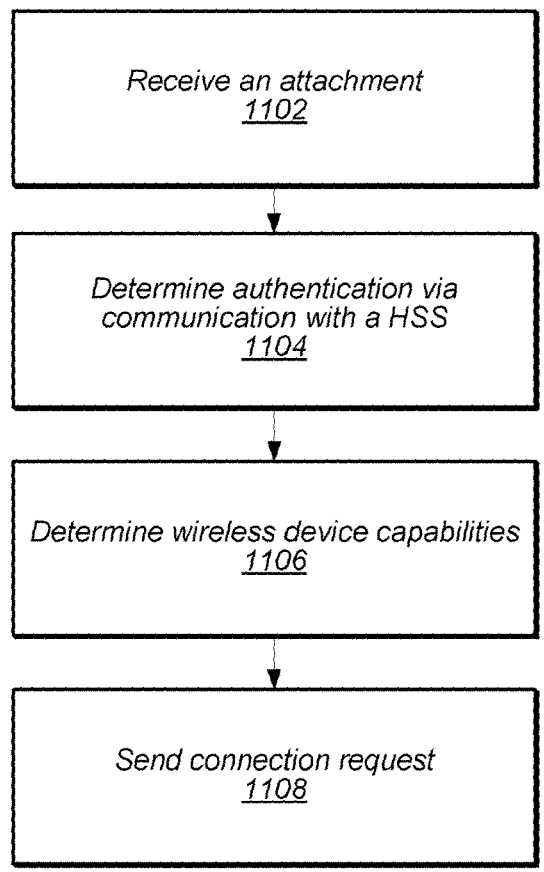
FIG. 11A illustrates an example of a method for a wireless device to attach to a next generation gateway, according to some embodiments.

FIG. 11A illustrates an example of a method for a wireless device, such as UE 106, to attach to a next generation gateway, such as GW 606, according to some embodiments. The method shown in FIG. 11A may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1102, an attachment request for a wireless device may be received. In some embodiments, the attachment request may be received from the wireless device. In other embodiments, the attachment request may be received from a base station of a legacy radio access network (RAN). In other words, the base station may be configured to communicate via one or more legacy RATs such as LTE, LTE-A, GSM, UMTS, CDMA2000, Wi-Fi, etc. In some embodiments, the request may include a packet data network (PDN) connectivity request.

At 1104, authentication of the wireless device may be determined via communication with a home subscriber server (HSS). In some embodiments, determining authentication via communication with the HSS may include sending an authentication request to the HSS and receiving the authentication information from the HSS.

At 1106, capabilities of the wireless device may be determined. In some embodiments, determining capabilities of the wireless device may include determining, based at least in part on the authentication information, whether the wireless device is capable of communication via the next generation RAN. In some embodiments, the authentication information may include subscription information associated with the wireless device. In other words, determining the capabilities of the wireless device may include determining whether there is a subscription to the next generation RAN associated with the wireless device.

At 1108, a connection request may be sent to a gateway of the next generation RAN. In some embodiments, the connection request may be sent in response to determining the capabilities of the wireless device. Alternatively, in some embodiments, where the attachment request is received from a base station (e.g., received by an MATE of a legacy RAN), a message may be sent to the wireless device in response to determining that the wireless device is capable of communication via the next generation RAN. The message may indicate that the connection request has been denied and may further include a request for the wireless device to attach via the next generation RAN (e.g., the wireless device may attach via a base station of the next generation RAN).

In some embodiments, a session response may be received from the gateway and may indicate that the session request has been accepted. Additionally, a message indicating that the attachment request has been accepted may be sent to the wireless device. In some embodiments, the session response may include an IP address of the gateway. Additionally, in some embodiments, the message may include the IP address.

In some embodiments, where the attachment request is received from the wireless device (e.g., received by a base station of the next generation RAN), a message may be sent to the wireless device in response to determining that the wireless device is not capable of communication via the next generation RAN. The message may indicate that the connection request has been denied and may further include a request for the wireless device to attach via a legacy RAN. In some embodiments, determining that the wireless device is not capable of communication via the next generation RAN may include determining that the wireless device is not associated with a subscription to the next generation RAN.

In some embodiments, where the attachment request is received from the wireless device (e.g., received by a base station of the next generation RAN), a query may be sent to a domain name system (DNS) server and the query may include a request for an internet protocol (IP) address for a gateway of the next generation RAN. In addition, a response may be received from the DNS server and may include a list of IP addresses for gateways of the next generation RAN. In some embodiments, the response may also include a mapping between the IP addresses for gateways of the next generation RAN and IP addresses for gateways of legacy RANs.

In some embodiments, where the attachment request is received from a base station (e.g., received by an MME of a legacy RAN), a first query may be sent to a domain name system (DNS) server and the first query may include a request for an internet protocol (IP) address for a gateway of the legacy RAN. In addition, a first response may be received from the DNS server and may include a list of IP addresses for gateways of the legacy RAN. Further, a second query a query may be sent to the DNS server and the second query may include a request for an internet protocol (IP) address for a gateway of the next generation RAN. Additionally, a second response may be received from the DNS server and may include a list of IP addresses for gateways of the next generation RAN. In some embodiments, the second response may also include a mapping between the IP addresses for gateways of the next generation RAN and IP addresses for gateways of legacy RANs.

Figure 11B:
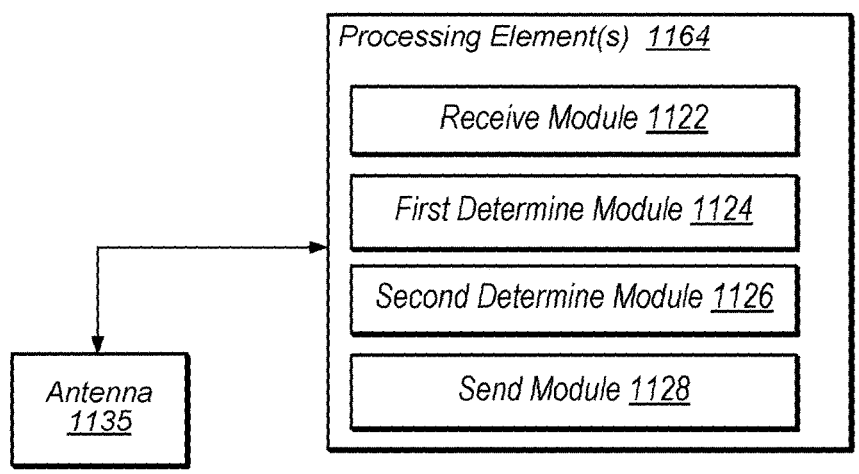
FIG. 11B illustrates a processing element including modules for attaching a wireless device to a next generation gateway, according to some embodiments.

FIG. 11B illustrates a processing element including modules for attaching a wireless device, such as UE 106, to a next generation gateway, such as GW 606, according to some embodiments. In some embodiments, antenna 1135 may be coupled to processing element 1164. The processing element may be configured to perform the method described above in reference to FIG. 11A. In some embodiments, processing element 764 may include one or more modules, such as modules (or circuitry) 1122-1128, and the modules (or circuitry) may be configured to perform various steps of the method described above in reference to FIG. 11A. In some embodiments, the processing element may be included in a mobility management entity, such as MME 632. In other embodiments, the processing element may be included in a base station, such as eNB 614. As shown, the modules may be configured as follows.

In some embodiments, processing element 1164 may include a receive module 1122 configured to receive an attachment request for a wireless device. In some embodiments, the attachment request may be received from the wireless device. In other embodiments, the attachment request may be received from a base station of a legacy radio access network (RAN). In other words, the base station may be configured to communicate via one or more legacy RATs such as LTE, LTE-A, GSM, UMTS, CDMA2000, Wi-Fi, etc. In some embodiments, the request may include a packet data network (PDN) connectivity request.

In some embodiments, processing element 1164 may include a first determine module 1124 configured to determine authentication of the wireless device via communication with a home subscriber server (HSS). In some embodiments, determining authentication via communication with the HSS may include sending an authentication request to the HSS and receiving the authentication information from the HSS.

In some embodiments, processing element 1164 may include a second determine module 1126 configured to determine capabilities of the wireless device. In some embodiments, determining capabilities of the wireless device may include determining, based at least in part on the authentication information, whether the wireless device is capable of communication via the next generation RAN. In some embodiments, the authentication information may include subscription information associated with the wireless device. In other words, determining the capabilities of the wireless device may include determining whether there is a subscription to the next generation RAN associated with the wireless device.

In some embodiments, processing element 1164 may include a send module 1128 configured to send a connection request to a gateway of the next generation RAN. In some embodiments, the connection request may be sent in response to determining the capabilities of the wireless device. Alternatively, in some embodiments, where the attachment request is received from a base station (e.g., received by an MME of a legacy RAN), the send module may be configured to send a message to the wireless device in response to determining that the wireless device is capable of communication via the next generation RAN. The message may indicate that the connection request has been denied and may further include a request for the wireless device to attach via the next generation RAN (e.g., the wireless device may attach via a base station of the next generation RAN).

It is apparent for those skilled in the art that, for the particular processes of the modules (or circuitry) described above (such as modules 1122, 1124, 1126, and 1128), reference may be made to the corresponding steps (such as steps 1102, 1104, 1106, and 1108, respectively) in the related process embodiment sharing the same concept and the reference is regarded as the disclosure of the related modules (or circuitry) as well. Furthermore, processing element 1164 may be implemented in software, hardware or combination thereof. More specifically, processing element 1164 may be implemented as circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processing element 1164 may be implemented as a general-purpose processor such as a CPU, and therefore each module can be implemented with the CPU executing instructions stored in a memory which perform a respective step.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A network node, comprising:
a memory; and
a processing element in communication with the memory, wherein the processing element is configured to:
   receive, from a base station of a fourth generation (4G) network operating according to a 4G legacy radio access technology (RAT) within the 4G network, an attachment request for a wireless device;
   send an authentication request to a home subscriber server (HSS), wherein the authentication request includes first subscription information associated with the wireless device;
   receive authentication information for authenticating the wireless device from the HSS, wherein the authentication information comprises second subscription information associated with the wireless device;
   determine, based at least in part on the authentication information, whether the wireless device is associated with a subscription for a fifth generation (5G) RAT within a 5G network;
   select, in response to determining that the wireless device is associated with the subscription for the 5G network, a first gateway that interfaces the 4G network and the 5G network, wherein the first gateway has a first user plane interface to a base station of the 5G network and a second user plane interface with the base station of the 4G network through one or more 4G network gateways, wherein the first user plane interface from the first gateway to the base station of the 5G network does not include any intervening 5G network gateway, and wherein the selection of the first gateway enables internet protocol (IP) address continuity with the first gateway in subsequent connections through a base station of the 5G network operating according the 5G RAT;
   send a connection request to the first gateway;
   receive, from the first gateway, a connection response comprising session information for connecting to the 5G network; and
   send, to the wireless device, a message indicating that attachment to the first gateway was successful.

2. The network node of claim 1,
wherein the processing element is further configured to:
   send a first query to a domain name system (DNS) server, wherein the first query includes a request for an internet protocol (IP) address for a gateway of the 4G network;
   receive a first response from the DNS server, wherein the first response includes a list of IP addresses for gateways of the 4G network;
   send a second query to the DNS server, wherein the second query includes a request for an IP address for a gateway of the 5G network; and
   receive a second response from the DNS server, wherein the second response includes a list of IP address for gateways of the 5G network.

3. The network node of claim 2,
wherein the second response also includes a mapping between the IP addresses for gateways of the 5G network and IP addresses for gateways of the 4G network.

4. The network node of claim 1,
wherein the attachment request includes a packet data network (PDN) connectivity request.

5. A non-transitory computer accessible memory medium comprising program instructions which, when executed at a network node, cause the network node to:
   receive, from a base station of a fourth generation (4G) network operating according to a 4G legacy radio access technology (RAT) within the 4G network, an attachment request for a wireless device;
   generate instructions to transmit an authentication request to a home subscriber server (HSS), wherein the authentication request includes first subscription information associated with the wireless device;
   receive authentication information from the HSS for authenticating the wireless device from the HSS, wherein the authentication information comprises second subscription information associated with the wireless device;
   determine, based at least in part on the authentication information, whether the wireless device is associated with a subscription for a fifth generation (5G) RAT within a 5G network;
   select, in response to determining that the wireless device is associated with the subscription for the 5G network, a first gateway that interfaces the 4G network and the 5G network, wherein the first gateway has a first user plane interface to a base station of the 5G network and a second user plane interface with the base station of the 4G network through one or more 4G network gateways, wherein the first user plane interface from the first gateway to the base station of the 5G network does not include any intervening 5G network gateway, and wherein the selection of the first gateway enables internet protocol (IP) address continuity with the first gateway in subsequent connections through a base station of the 5G network operating according the 5G RAT;
   generate instructions to transmit a connection request to the first gateway;
   receive, from the first gateway, a connection response comprising session information for connecting to the 5G network; and generate instructions to transmit a first message to the wireless device indicating that the attachment to the first gateway was successful.

6. The non-transitory computer accessible memory medium of claim 5,
wherein the attachment request includes a packet data network (PDN) connectivity request.

7. The non-transitory computer accessible memory medium of claim 5,
wherein, after selecting the first gateway and prior to generating instructions to transmit the first message, the program instructions are further executable to:
generate instructions to transmit, to the first gateway, a second message to create a session; and
receive, from the first gateway, a third message comprising an IP address in response to the second message.

8. The non-transitory computer accessible memory medium of claim 7,
wherein the first message comprises the IP address.

9. The network node of claim 1,
wherein the session information for connecting to the 5G network includes an IP address.

10. The network node of claim 1,
wherein the message includes the session information for connecting to the 5G network.

11. An apparatus, comprising:
a memory; and
at least one processor in communication with the memory, wherein the at least one processor is configured to:
receive, from a base station of a fourth generation (4G) network operating according to a 4G legacy radio access technology (RAT) within the 4G network, an attachment request for a wireless device;
determine authentication information via communication with a home subscriber server (HSS), wherein, to authenticate the wireless device, the communication comprises at least an exchange of subscription information associated with the wireless device;
determine, based at least in part on the subscription information, whether the wireless device is associated with a subscription for a fifth generation (5G) RAT within a 5G network;
select, in response to determining that the wireless device is associated with the subscription for the 5G network, a first gateway that interfaces the 4G network and the 5G network, wherein the first gateway has a first user plane interface to a base station of the 5G network and a second user plane interface with the base station of the 4G network through one or more 4G network gateways, wherein the first user plane interface from the first gateway to the base station of the 5G network does not include any intervening 5G network gateway, and wherein the selection of the first gateway enables internet protocol (IP) address continuity with the first gateway in subsequent connections through a base station of the 5G network operating according the 5G RAT;
generate instructions to transmit a connection request to the first gateway;
receive, from the first gateway, a connection response comprising session information for connecting to the 5G network; and
generate instructions to transmit a first message to the wireless device indicating that the attachment to the first gateway was successful.

12. The apparatus of claim 11,
wherein, after selecting the first gateway and prior to generating instructions to transmit the first message, the at least one processor is further configured to:
generate instructions to transmit, to the first gateway, a second message to create a session; and
receive, from the first gateway, a third message comprising an IP address in response to the second message.

13. The apparatus of claim 12,
wherein the first message comprises the IP address.

14. The apparatus of claim 11,
wherein the attachment request includes a packet data network (PDN) connectivity request.

15. The apparatus of claim 11,
wherein, to determine authentication information, the at least one processor is further configured to:
generate instructions to cause an authentication request to be sent to the HSS; and
receive the authentication information from the HSS.

16. The apparatus of claim 11,
wherein the session information for connecting to the 5G network includes an IP address.

17. The non-transitory computer accessible memory medium of claim 5,
wherein the session information for connecting to the 5G network includes an IP address.

18. The non-transitory computer accessible memory medium of claim 5,
wherein the first message includes the session information for connecting to the 5G network.

19. The network node of claim 1,
wherein, after selecting the first gateway and prior to send the message, the processing element is further configured to:
send, to the first gateway, a first message to create a session; and
receive, from the first gateway, a second message comprising an IP address in response to the first message.

20. The network node of claim 19,
wherein the first message comprises the IP address.

* * * * *